(12) United States Patent
Norem et al.

(10) Patent No.: US 8,689,567 B2
(45) Date of Patent: Apr. 8, 2014

(54) CLUTCH LOCKING PLATE WITH OIL SLINGER

(75) Inventors: Dean A. Norem, Cherry Valley, IL (US); Jody A. Peterson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 593 days.

(21) Appl. No.: 12/886,599

(22) Filed: Sep. 21, 2010

(65) Prior Publication Data

US 2012/0067167 A1 Mar. 22, 2012

(51) Int. Cl.
*F02C 7/277* (2006.01)
*F16N 7/26* (2006.01)

(52) U.S. Cl.
USPC .............. 60/788; 192/113.5; 192/42; 192/46; 29/889.2; 29/893.2; 29/525.11; 184/13.1

(58) Field of Classification Search
USPC ....... 74/7 C; 192/113, 5, 42, 46, 41; 123/179, 123/179.27; 184/13.1; 29/889.2, 893.1, 29/893.2, 525.01, 525.11; 60/786–788
See application file for complete search history.

(56) References Cited

U.S. PATENT DOCUMENTS

| | | | | |
|---|---|---|---|---|
| 2,937,730 | A | * | 5/1960 | Quenneville .............. 192/103 A |
| 3,144,097 | A | * | 8/1964 | Ebert ............................ 184/13.1 |
| 3,552,534 | A | * | 1/1971 | Kern ......................... 192/113.34 |
| 4,397,470 | A | | 8/1983 | Carroll et al. |
| 4,741,303 | A | | 5/1988 | Kronich |
| 4,810,126 | A | | 3/1989 | Lengel |
| 5,699,877 | A | * | 12/1997 | Dreier .......................... 184/11.2 |
| 5,875,619 | A | | 3/1999 | McLean et al. |
| 6,698,762 | B2 | | 3/2004 | Newberg et al. |
| 6,838,778 | B1 | | 1/2005 | Kandil et al. |
| 6,838,779 | B1 | | 1/2005 | Kandil et al. |
| 7,131,275 | B2 | | 11/2006 | Gustafson |
| 7,253,535 | B2 | | 8/2007 | Duesterhoeft |
| 7,866,444 | B2 | * | 1/2011 | Aldridge ....................... 184/6.18 |
| 2007/0295557 | A1 | * | 12/2007 | Aldridge ...................... 184/13.1 |
| 2012/0171017 | A1 | * | 7/2012 | Norem et al. .............. 415/122.1 |

* cited by examiner

*Primary Examiner* — David M Fenstermacher
*Assistant Examiner* — Terence Boes
(74) *Attorney, Agent, or Firm* — Carlson, Gaskey & Olds, PC

(57) ABSTRACT

A locking plate for use in an air turbine starter has a lock plate body including an oil slinger extending away from a base. The base is positioned on an outer peripheral surface of a clutch frame. The slinger extends away from the base for a distance, and a ratio of the distance to a thickness of the base is ten and thirty. A clutch and air turbine starter, and a method of assembly are also disclosed.

10 Claims, 2 Drawing Sheets

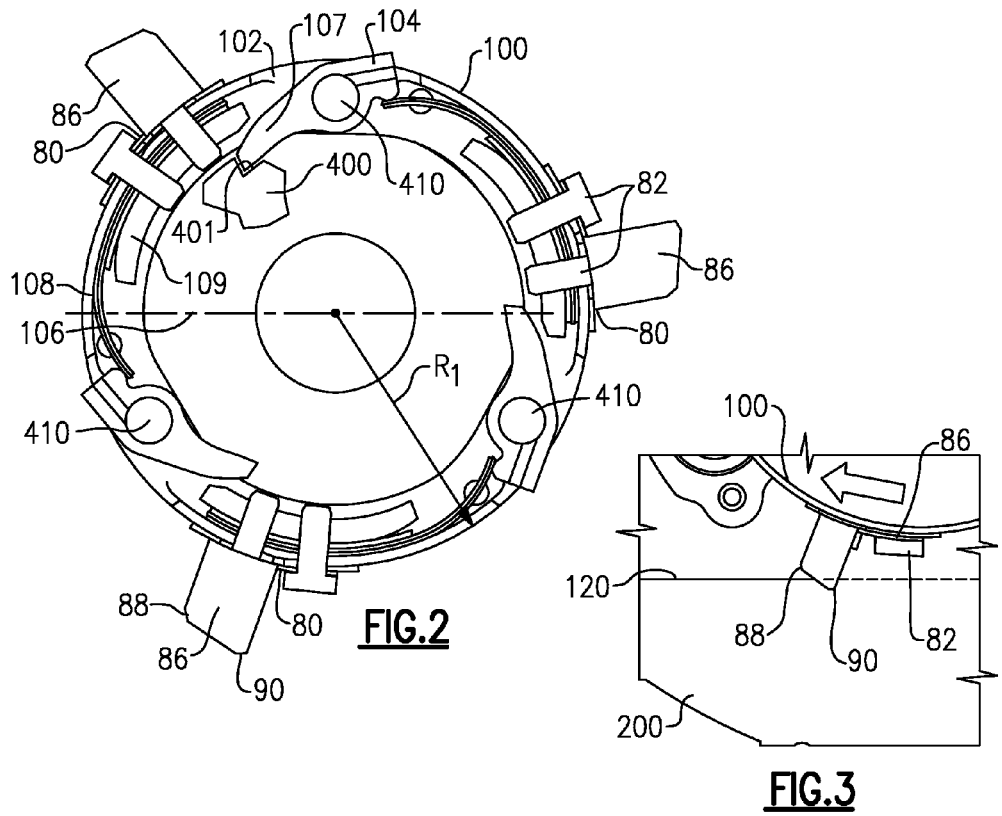
FIG.2
FIG.3
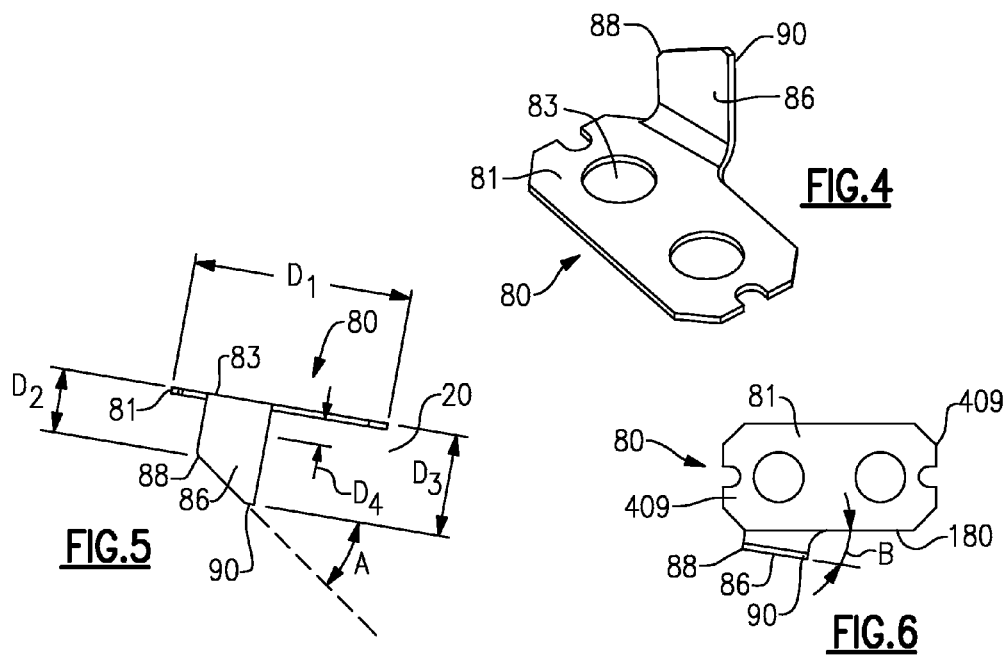
FIG.4
FIG.5
FIG.6

CLUTCH LOCKING PLATE WITH OIL SLINGER

BACKGROUND

This application relates to a clutch such as may be utilized in an air turbine starter, wherein a locking plate carries an oil slinger to ensure adequate oil distribution.

Air turbine starters are known, and include a turbine rotor which receives compressed air from an auxiliary power unit (APU). The compressed air drives the turbine rotor, to in turn drive an output shaft. The output shaft is connected to a prime mover, such as a gas turbine engine in an aircraft, and is utilized as a starter to begin rotation of the engine core.

Soon after the engine begins to be driven by its own power, the air flow to the air turbine starter is stopped. The output shaft continues to rotate, but is now driven by the gas turbine engine. Thus, a clutch typically is positioned intermediate between the output shaft, and the turbine rotor, such that the entire air turbine starter is not driven.

In the existing system, a locking plate secures a plurality of bolts at the periphery of the clutch assembly, which mount springs as part of the clutch.

In known air turbine starters, oil is provided to lubricate components of the air turbine starter. This oil sits at a particular level within a housing for the air turbine starter. Over time, the level of oil may deteriorate.

SUMMARY

A locking plate for use in an air turbine starter has a lock plate body includes an oil slinger extending away from a base. The base is to be positioned on an outer peripheral surface of a clutch frame. The slinger extends away from the base for a distance, and a ratio of the distance to a thickness of the base is between ten and thirty.

A clutch and air turbine starter, and a method of assembly are also disclosed and claimed.

These and other features of the present invention can be best understood from the following specification and drawings, the following of which is a brief description.

BRIEF DESCRIPTION OF THE DRAWINGS

FIG. 2 is a detail of a portion of a clutch.

FIG. 3 is a further detail of a portion of the clutch.

FIG. 4 is a perspective view of a locking plate.

FIG. 5 is a side view of a locking plate.

FIG. 6 is a top view of the locking plate.

DETAILED DESCRIPTION

Figure 1:
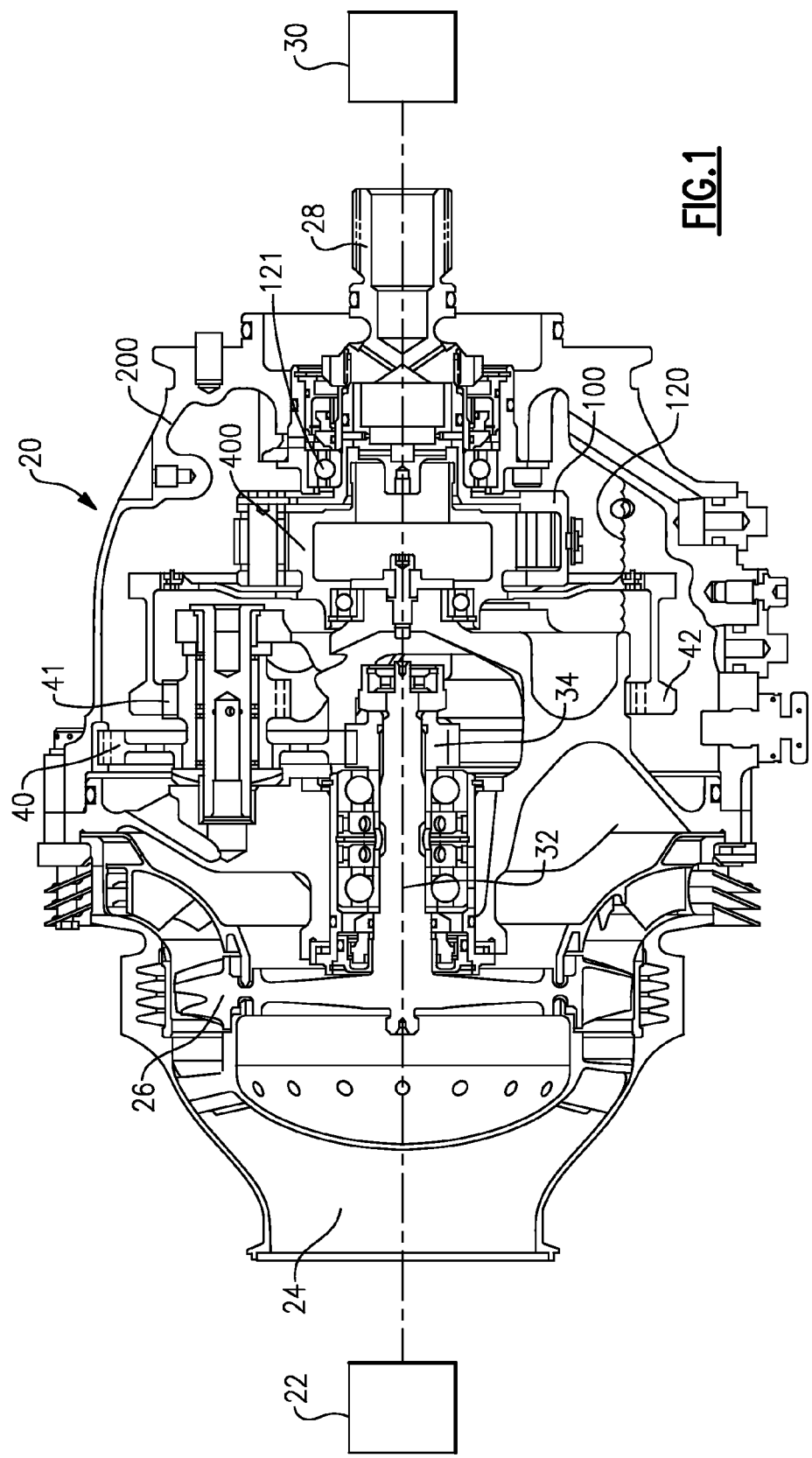
FIG. 1 is a cross-sectional view through an air turbine starter.

An air turbine starter assembly 20 may be associated with an aircraft, or other systems including a gas turbine engine. A source of hot air 22, which may be from an auxiliary power unit, as typically utilized while on the ground, delivers high pressure air into an inlet 24. The high pressure air flows across a turbine rotor 26, causing the turbine rotor 26 to rotate. As the turbine rotor 26 rotates, it rotates a planetary gear system 40/41, and ultimately the output shaft 28. The output shaft 28 may be utilized as an engine starter, to start operation of a main gas turbine engine 30 as a prime mover.

The planetary gear system includes a sun gear 34 that is driven by a rotor shaft 32 that rotates with the turbine rotor 26. During engine starts, the sun gear 34 drives a plurality of planet gears 40. The planet gears 40 include output gear teeth 41, which drive a ring gear 42. The ring gear 42 drives the clutch ratchet 400, which drives a clutch frame 100 via a connection between the clutch ratchet 400, which has ratchet teeth 401 which engage tips 107 of pawls 104 (see FIG. 2). The clutch frame 100 is splined to, and drives, the output shaft 28.

Multiple locking plates 80 (here three) are used in each clutch assembly. The locking plates 80 rotate with the clutch frame 100. Bearings 121 are shown schematically.

A level of oil 120 is positioned within a housing 200 for the air turbine starter. A major goal of the oil slinger to be disclosed is to adequately lubricate the continuously operating components, and specifically the bearings 121. The shown oil level 120 reflects the freshly serviced 'full' level.

During starter operation, the turbine rotor 26 drives the output shaft 28, through the clutch to in turn rotate the core of the gas turbine engine 30. However, once the engine 30 has ignited and begun to be driven on its own, the clutch pawls disconnect, the turbine rotor and clutch ratchet 400 stops, and the output shaft continues to rotate.

FIG. 2 shows details of the clutch. As shown, the clutch frame 100 contains pawls 104 extending through openings 102. Springs 108 are clamped to the internal surface of the clutch frame 100. The spring 108 ends that are remote from mount cleat 109 engage the heel on the pawl 104, and bias tips 107 of pawls 104 into clutch ratchet teeth 401 (shown schematically) on the clutch plate 106. The pawls 104 rotate about pivot pins 410. The clutch plate 106 is connected to the ring gear 42 and ceases to rotate after turbine engine is self sustaining. The clutch frame 100 continues to be driven with the output shaft 28.

As shown, bolts 82 extend through the base of the locking plate 80, thru the clutch frame 100, and into threaded holes in the spring cleat 109 to secure the springs 108 to the clutch 100. The locking plate 80 is sandwiched between a head of bolt 82 and an outer peripheral surface of the clutch frame 100. As shown, the locking plate 80 are formed with an integral oil slinger 86. In the view of FIG. 2, clutch rotation would be in the clockwise direction. The oil slinger 86 of locking plate 80 has a leading edge 88 which is radially closer to the locking plate 80 outer periphery than a trailing edge 90. Thus, as the oil slinger 86 is driven to enter the oil level 120 (see FIG. 3), the ramped shape between the ends 88 and 90 facilitates smooth entry into the free surface of the oil level 120.

A method of assembling clutch frame 100 includes the steps of providing a clutch frame 100 having an outer peripheral surface and defining an inner bore, and then moving bolts 82 through a locking plate 80 on the outer peripheral surface, and through a spring 108 and cleat 109 in the inner bore to secure the spring on the inner bore. The locking plate is formed with oil slinger 86.

FIG. 3 shows locking plate 80 receiving bolts 82, and mounting the oil slinger 86 for rotation into the oil level 120.

FIG. 4 shows a detail of the locking plate 80 having a base surface 81 including two bolt holes 83 to receive the bolts 82. The oil slinger 86 can be seen to have the ends 88 and 90.

Returning briefly to FIG. 2, it can be seen that the clutch frame 100 outer periphery is at radius $R_1$. In one embodiment, $R_1$ was 2.125 (5.397 cm).

In FIG. 5, it can be seen that the base portion 81 of the shim 80 extends for a distance $D_1$. In one embodiment, $D_1$ was 1.23" (3.12 cm).

The close or upstream end 88 is formed at a distance $D_2$ from a bottom end of the base plate 81. In one embodiment, $D_2$ was 0.37" (0.94 cm). The remote or downstream end 90 is formed at a distance $D_3$ from the lower end of the base plate 81. In one embodiment, $D_3$ was 0.600" (1.52 cm). A thickness of the base 81 is 0.032" (0.081 cm) in one embodiment. In this same embodiment, a bolt head extends for an approximate distance $D_4$ above the base. $D_4$ was 0.200" (0.508 cm) in one embodiment. One could say that a ratio of the height $D_3$ to the thickness of the base plate 81 is between ten and thirty. Also, the oil slinger extends away for a greater distance than the head of the bolt.

In embodiments, a ratio of $D_2$ to $D_3$ was between 0.45 and 0.95. A ratio of $D_3$ to $D_1$ was between 0.30 and 0.70. A ratio of $R_1$ to $D_3$ was between 3.0 and 4.5.

As shown, an angle A, for example a tip angle measure along the tip of oil slinger 86, is identified relative to a plane parallel to the base plate 81, and between ends 88 and 90. In one embodiment, the angle A was 35°. In embodiments, the angle A is between 5 and 60°. Angle A is also functionally related to the free surface of the oil volume, pertaining to graceful entry into the oil during clutch rotation.

As shown in FIG. 6, there is also a cant to the oil slinger 86 relative to a side edge 180 of the base portion 81. A cant angle B can be defined from the side edge 180 in a direction from the end 88 heading toward the end 90. Due to the cant angle, a downstream end 90 of the oil slinger is formed at a greater distance from a side wall 180 of a portion 81 of the shim, which is in contact with the outer periphery, than does an upstream end 88 of the oil slinger. In one embodiment, the angle B was 10°. In embodiments, the angle B is between 1° and 25°.

As manufactured, the locking plate 80 may have its base 81 be relatively planar. However, when secured to the outer periphery of the clutch frame 100, it bends about a central axis. In addition, once the bolts are secured in the locking plate, the circumferential edges of the locking plate identified by 409 in FIG. 6, may be bent outwardly to lock the bolt heads.

The locking plate 80 having the oil slinger incorporated into the shim is thus able to provide adequate oil flow to components which are rotating even when the oil level drops below the optimum full amount. This facilitates an oil consumption or service interval for the turbine starter, which permits some oil consumption or leakage while still providing adequate lubrication during that period.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A locking plate for use in an air turbine starter comprising:
    a lock plate body including an oil slinger extending away from a base, said base positioned on an outer peripheral surface of a clutch frame, and said slinger having a leading edge extending away from the base for a distance, and a ratio of said distance to a thickness of said base is between ten and thirty;
    said oil slinger having a cant angle, such that a downstream end of said oil slinger is at a greater distance from a side wall of said base than an upstream end of said oil slinger, said cant angle being between 1° and 25°, the upstream end of said oil slinger being positioned to be closer to the base than said downstream end, a tip angle defined along a tip of said oil slinger, and between said upstream end and said downstream end, said tip angle being between 5° and 60°; and
    said base having a bolt hole extending there through.

2. The locking plate as set forth in claim 1, wherein a ratio of a height to the downstream end of said oil slinger measured from the base to a length of said base is between 0.30 to 0.70.

3. The locking plate as set forth in claim 1, wherein there are two of said bolt holes extending through said base.

4. A clutch comprising:
    a clutch frame having an inner bore, and an outer peripheral surface, at least one bolt extending through a hole in said outer peripheral surface, and into said inner bore, said at least one bolt sandwiching a locking plate between a head of said bolt and said outer peripheral surface of said clutch frame, said bolt securing a spring within said inner bore, said locking plate including an oil slinger having a leading edge extending away from a base, said base being positioned on the outer peripheral surface, and said oil slinger extending radially away from a central axis of said clutch frame for a greater distance than the head of said bolt; and
    said clutch frame further mounting a pawl, said spring biasing said pawl in a rotational direction about a pivot pin; said oil slinger having a cant angle, such that a downstream end of said oil slinger is at a greater distance from a side wall of said base than an upstream end of said oil slinger, said cant angle being between 1° and 25°, the upstream end of said oil slinger being positioned to be closer to the base than said downstream end, a tip angle defined along a tip of said oil slinger, and between said upstream end and said downstream end, said tip angle being between 5° and 60°; and said base having a bolt hole extending there through.

5. The clutch as set forth in claim 4, wherein a ratio of a radius of said clutch frame to the outer peripheral surface from the central axis to a distance to an end of said oil slinger spaced furthest from said central axis from said base of said locking plate is between 3.0 and 4.5.

6. The clutch as set forth in claim 4, wherein said oil slinger extends radially away from a central axis of said clutch frame for a distance, and a ratio of said distance to a thickness of said base is between ten and thirty.

7. An air turbine starter comprising:
    a turbine rotor for selectively being driven within a housing;
    a clutch frame having an inner bore, and an outer peripheral surface, at least one bolt extending through a hole in said outer peripheral surface, and into said inner bore, said at least one bolt sandwiching a locking plate between a head of said bolt and said outer peripheral surface of said clutch frame, said bolt securing a spring within said inner bore, said locking plate including an oil slinger having a leading edge extending away from a base, said base being positioned on the outer peripheral surface, and said oil slinger extending radially away from a central axis of said clutch frame for a greater distance than a head of said bolt; said oil slinger having a cant angle, such that a downstream end of said oil slinger is at a greater distance from a side wall of said base than an upstream end of said oil slinger, said cant angle being between 1° and 25°, the upstream end of said oil slinger being positioned to be closer to the base than said downstream end, a tip angle defined along a tip of said oil slinger, and between said upstream end and said downstream end, said tip angle being between 5° and 60°; and said base having a bolt hole extending there through said turbine rotor driving a clutch plate through a planetary gear system, and said clutch frame driving an output shaft for being utilized as a starter input to start a prime mover;

said clutch frame further mounting a pawl, said spring biasing said pawl in a rotational direction about a pivot pin; and said pawls selectively engaging teeth in said clutch plate, such that said pawls can be biased out of said teeth to allow relative rotation between said clutch plate and said clutch frame, and biased into said teeth to cause said clutch frame and said clutch plate to rotate together.

8. The air turbine starter as set forth in claim 7, wherein a ratio of a radius of said clutch frame to the outer peripheral surface from the central axis to a distance to an end of said oil slinger spaced furthest from said central axis from said base of said locking plate is between 3.0 and 4.5.

9. A method of installing a locking plate with an integral oil slinger on a clutch frame in an air turbine starter comprising the steps of:

(a) providing a clutch frame having a plurality of holes for receiving a locking plate;

(b) placing a locking plate on an outer periphery of the clutch frame, and placing a spring within an inner bore of the clutch frame, and moving a bolt through the locking plate and the hole to secure the spring in the inner bore, the spring being positioned to bias a pawl; and (c) mounting said clutch frame into an air turbine starter such that the oil slinger will extend into oil within a housing for the air turbine starter, with the oil slinger extending away from a central axis of the clutch frame for a distance; providing said locking plate body with said oil slinger extending away from a base, said base positioned on an outer peripheral surface of a said clutch frame, providing said slinger with a leading edge extending away from the base for a distance, and a ratio of said distance to a thickness of said base is between ten and thirty; providing said oil slinger with a cant angle, such that a downstream end of said oil slinger is at a greater distance from a side wall of said base than an upstream end of said oil slinger, said cant angle being between 1° and 25°, the upstream end of said oil slinger being positioned to be closer to the base than said downstream end, providing a tip angle defined along a tip of said oil slinger, and between said upstream end and said downstream end, said tip angle being between 5° and 60°; and providing said base with a bolt hole extending there through.

10. The method as set forth in claim 9, wherein a clutch plate is formed with teeth, and is mounted within the inner bore, with the pawls engaging the teeth.

\* \* \* \* \*